US009156438B2

(12) United States Patent
Biondo et al.

(10) Patent No.: US 9,156,438 B2
(45) Date of Patent: Oct. 13, 2015

(54) ATTACK RESISTANT THEFT DETERRENT SYSTEM

(71) Applicant: GM GLOBAL TECHNOLOGY OPERATIONS LLC, Detroit, MI (US)

(72) Inventors: William A. Biondo, Beverly Hills, MI (US); David T. Proefke, Troy, MI (US); Thomas M. Forest, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 97 days.

(21) Appl. No.: 14/036,411

(22) Filed: Sep. 25, 2013

(65) Prior Publication Data
US 2015/0084753 A1   Mar. 26, 2015

(51) Int. Cl.
*B60R 25/10* (2013.01)
*B60R 25/24* (2013.01)
*B60R 25/04* (2013.01)

(52) U.S. Cl.
CPC ............... *B60R 25/24* (2013.01); *B60R 25/04* (2013.01); *B60R 25/246* (2013.01); *B60R 2025/0415* (2013.01); *B60R 2325/108* (2013.01)

(58) Field of Classification Search
CPC   B60R 25/04; B60R 2025/0415; B60R 25/24; B60R 25/246
USPC ................... 340/426.11, 5.26, 5.31; 307/10.3
See application file for complete search history.

(56) References Cited

U.S. PATENT DOCUMENTS

| 6,624,738 B2* | 9/2003 | Bracklo et al. ............... 340/3.51 |
| 7,034,654 B2* | 4/2006 | Forest et al. ................. 340/5.26 |
| 2005/0146218 A1* | 7/2005 | Kemper ....................... 307/10.3 |

OTHER PUBLICATIONS

"SHE Secure Hardware Extension", Fujitsu Semiconductor Europe GMBH, Workshop on Cryptography and Embedded Security, Embedded World At Nuremberg, Feb. 2012, p. 1-31.

* cited by examiner

*Primary Examiner* — John A Tweel, Jr.
(74) *Attorney, Agent, or Firm* — Ingrassia Fisher & Lorenz, P.C.

(57) ABSTRACT

Systems and methods for theft deterrence of a vehicle are provided. Each of two or more immobilization point devices generate a random number and broadcasts it to all of the other immobilization points devices. Each of the immobilization point devices retains a local copy of its own random number and concatenates the local copy of its own random number with the random numbers of the other of the two or more immobilization point devices from the bus. From the random numbers broadcast on the bus, all of the random numbers are concatenated in a predetermined sequence to form a single challenge, which is transmitted to a remote transponder. Each of the immobilization point devices then compares a single response from the transponder to their local concatenation. When a specific portion of the response from the transponder matches a local concatenation, then enabling the function of the immobilization point device.

16 Claims, 3 Drawing Sheets

ATTACK RESISTANT THEFT DETERRENT SYSTEM

TECHNICAL FIELD

The technical field generally relates to vehicle theft deterrent systems. Specifically, the field relates to the use of concatenation of random security key codes from, and independent authentication of, one or more user identification devices by multiple components necessary to start and/or operate a vehicle.

BACKGROUND

Although somewhat in a decline in recent years, auto theft is a continual problem. Nationwide in the U.S. in 2005, there were an estimated 1.2 million motor vehicle thefts, or approximately 416.7 motor vehicles stolen for every 100,000 inhabitants. Property losses due to motor vehicle theft in 2005 were estimated at $7.6 billion. Since then the number of motor thefts nationally has declined. The most recent statistics, for 2009, show an estimated 794,616 thefts of motor vehicles nationwide, representing property losses of nearly $5.2 billion.

Today, many motor vehicles utilize immobilizer systems where a master module seeks confirmation of the presence of other modules, such as a key fob, before allowing a vehicle to start. This master module has typically been the engine control module (ECM).

FIG. 1 is a simplified functional block diagram of a prior art theft deterrent system 10 for a vehicle 1. The system comprises a key/key fob with an electronic transponder 2. The vehicle 1 comprises an immobilizer module 5 and an engine control module 3 with a secret key code 4 that may be a random number, which is shared (i.e., known) by the immobilizer module 5 and the transponder 2. When the immobilizer module 5 detects the transponder 2, the immobilizer module 5 transmits a challenge signal 6 to the transponder 2. The transponder replies with a response computed using with the secret key code 4. When the immobilizer module 5 receives the response which correctly matches its expected response value, it communicates with the ECM 5 to allow the engine to start.

The communication between the immobilizer module 5 and the ECM 3 may occur through unsecured data transmission, password protected data transmission, or an additional challenge/response mechanism using the same or different secret key code 4 used by the immobilizer module 5 and transponder 2.

The relationship between the challenge 6 and the response 7 between the immobilizer module 5 and the transponder 2 is based on a cryptographic algorithm that utilizes the secret key code 4 shared by the immobilizer module 5 and the transponder 2. Those skilled in the art know that there are several methods by which this may be done—examples include the transponder computing a cryptographic Message Authentication Code (MAC) on the challenge (possibly along with other fixed form information) utilizing the secret key code 4, or encrypting the challenge 6 (possibly along with other fixed-form information) using a block cipher.

Examples of Message Authentication Code algorithms include HMAC (standardized in Federal Information Processing Standard Publication 198) and CMAC (standardized in NIST Special Publication 800-38); Examples of block ciphers include the Advanced Encryption Standard (AES) standardized in Federal Information Processing Standard Publication 197 and the Data Encryption Standard (DES), standardized in Federal Information Processing Standard Publication 46-3. In the case of a MAC-based approach the immobilizer module 5 would perform the same operation and verify that the challenge 6 provided by the transponder 2 is correct.

In the encryption-based approach the immobilizer module 5 would decrypt the challenge 6 and verify that the decryption has the expected form, or perform an identical encryption and verify that the challenge 6 matches the expected value. Regardless of the particular method used, the process of both generating the response 7 (done by the transponder) and verifying that the response 7 is correct (done by the immobilizer module 5) requires knowledge of the secret key code.

While this methodology is effective at a certain level, the situation where only one master immobilizer module 5 provides the final authorization necessary to start the vehicle may not always provide for an optimal theft deterrent system, for example due to possible tampering with the immobilizer unit 5 or ECM 3 by a hacker in order to start the vehicle. Physical part swapping and software manipulation remain problems to be resolved.

Thus, it is desirable to address these issues and provide improved theft deterrence by enhancing the theft deterrent systems in vehicles. Furthermore, other desirable features and characteristics of the systems and methods disclosed herein will become apparent from the subsequent detailed description and the appended claims, taken in conjunction with the accompanying drawings and the preceding background.

SUMMARY

A vehicle theft deterrence system is provided comprising a remote transponder, two or more immobilization point devices, wherein only one of the two or more immobilization point devices is in wireless communication with the remote transponder, the two or more immobilization point devices being configured to each independently verify that the remote transponder is an authorized remote transponder, and a communication bus interconnecting each of the two or more immobilization point devices.

A method for theft deterrence of a vehicle comprising two or more immobilization point devices and a communication bus is provided. The method comprises each of the two or more immobilization point devices generating a random number and broadcasting their random number on the bus to all of the other two or more immobilization points, where in each of the two or more immobilization point devices retains a local copy of its own random number and each of the two or more immobilization point devices concatenating the local copy of its own random number with the random numbers of the other of the two or more immobilization point devices from the bus. From the random numbers broadcast on the bus, concatenating all of the random numbers in a predetermined sequence to form a single challenge and wirelessly transmitting the single challenge to a remote transponder in response to a message from the transponder. The method further comprises that each of the two or more immobilization point devices compares a single response from the transponder to their local concatenation and when the at least a portion of the response from the transponder matches a local concatenation of a immobilization point device, then enabling the function of the immobilization point device.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
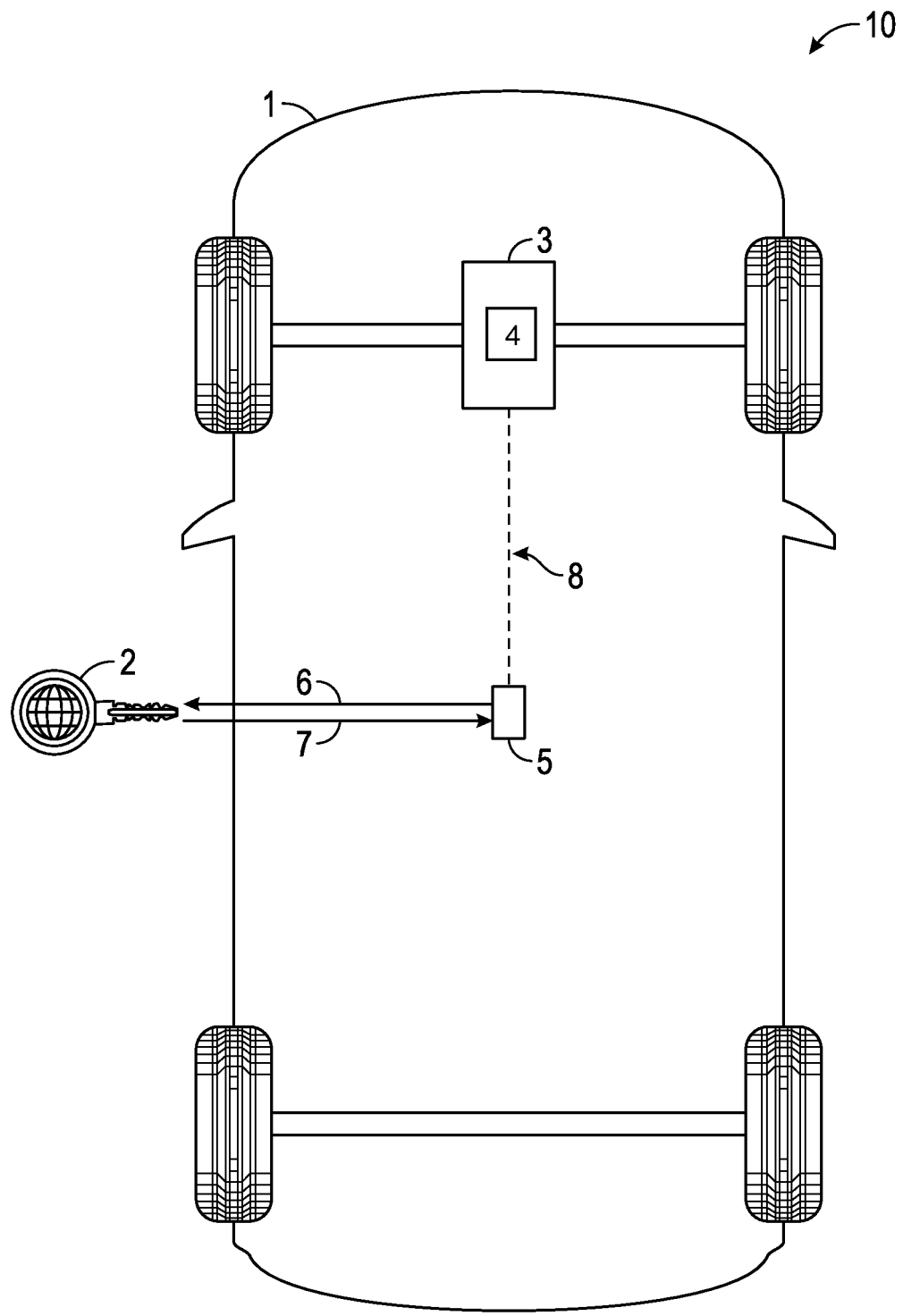
FIG. 1 is a simplified functional block diagram of an exemplary prior art theft deterrent system.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, firmware or software executing on a processor, configured to perform the specified functions. To clearly illustrate this interchangeability of hardware and software, various illustrative components, blocks, modules, circuits, and steps have been described above generally in terms of their functionality. Whether such functionality is implemented as hardware or software executing on a processor depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 2:
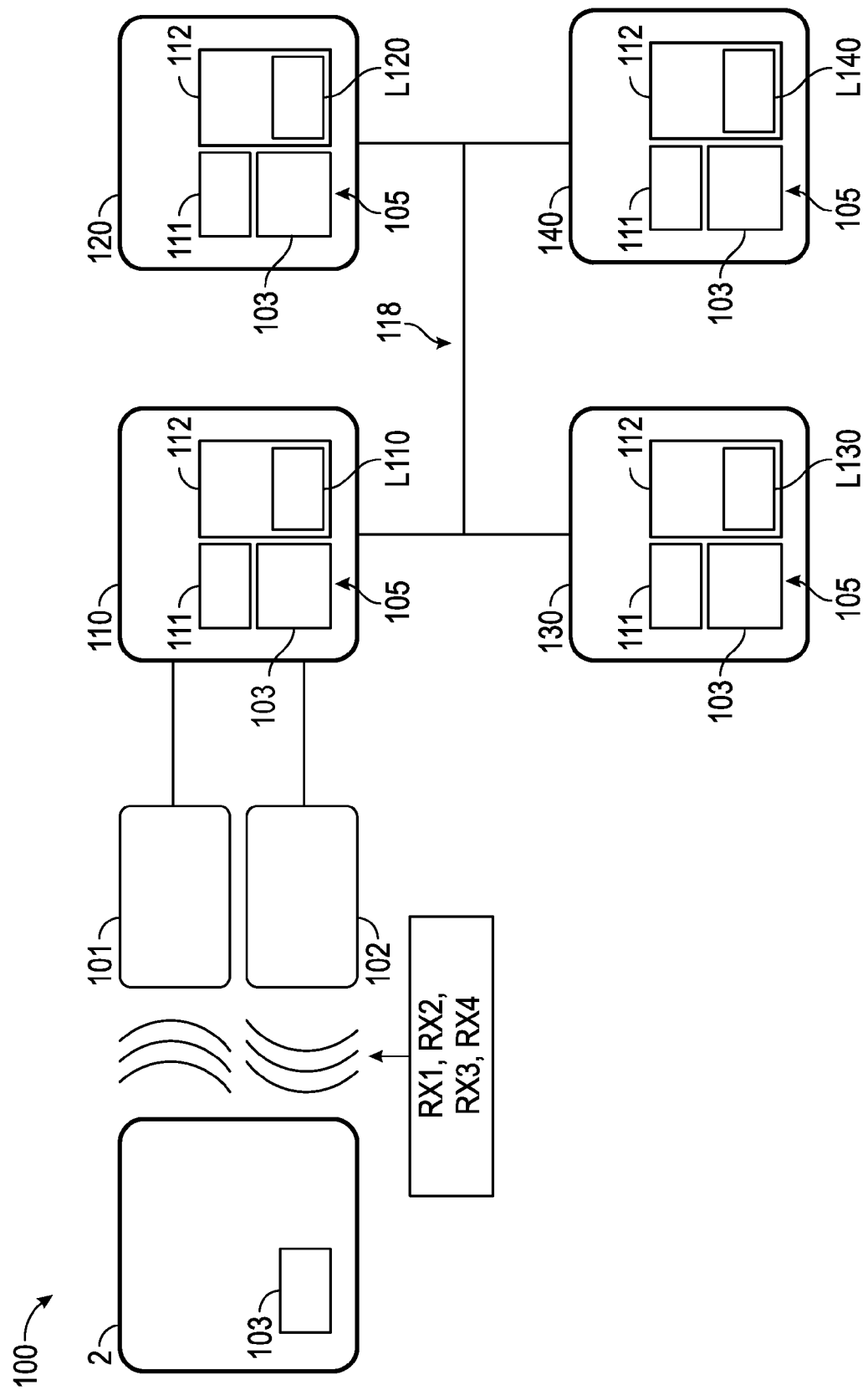
FIG. 2 is a simplified functional block diagram of an exemplary theft deterrent system according to embodiments.

FIG. 2 is simplified functional block diagram of a theft deterrent system 100 according to embodiments disclosed herein. The theft deterrent system 100 includes an immobilizer system transmission antenna 101, which may be a standalone antenna or an antenna shared with other systems of vehicle 1 and transmits challenges to the transponder 2. Similarly, a radio frequency receiver 102 is included to receive responses from transponder 2. In alternative equivalent embodiments, both the challenge transmission and response reception may be performed by the same antenna or by a single radio frequency transceiver.

Theft deterrent system 100 includes a plurality of immobilization points that contain security logic executing on a processor. Among other cryptographic functions executed by the security logic of an immobilization point, each immobilization point is configured to make a separate, independent determination based on a single challenge and a single associated challenge reply as to whether to enable its related function such that the vehicle becomes mobile. The number of immobilization points that may be used in a system is greater than one and may include as many as a system designer may consider necessary to provide adequate theft deterrence.

An immobilization point is a component of vehicle the operation of which is necessary for the vehicle 1 to become mobile. Non-limiting examples of immobilization points are include the engine, fuel system, transmission, steering, and the ignition. In the interest of clarity and brevity, the immobilization points discussed herein will be limited to a body control module 110, transmission control module 120, an engine control module 130 and a fuel system control module 140. As a general principle assumed throughout the following disclosure, the more difficult it is to access or replace an immobilization point device, the more secure the system will be. For example, a fuel control immobilization device located in the gas tank is a non-limiting example of a difficult to access location/device. Further, it is assumed that each immobilization point device comprises electronic hardware that is configured to unreachably store secret data 103. That hardware includes at least a processor 111 and a memory device 112. A discussion of such security devices that exist in the art that may be suitable for use in an immobilization point is beyond the scope of this disclosure and will not be discussed further. In embodiments herein, the same secret key code data 103 would be pre-provided to all immobilization points/devices.

In addition to unreachably storing secret key code data 103, the electronic hardware (e.g., 111, 112) described in the previous section is assumed to allow restrictions on the types of cryptographic operations that can be done using the stored secret data. For example, the device (e.g., 111, 112) can be configured to allow the use of the secret data to verify a Message Authentication Code (MAC), but not to generate the corresponding MAC, or the device (e.g., 111, 112) could be configured to allow the device to decrypt information using the secret data but not to encrypt it using the same secret data. Such restrictions on the use of the secret data within the device (e.g., 111, 112) offer the possibility of enforcing limitations on the behavior of the device even if the main computer of the device is compromised by a thief. Again, discussion of such security devices that exist in the art that may be suitable for use in an immobilization point is beyond the scope of this disclosure and will not be discussed further.

Further, other logical immobilization points may be created such as body control module (BCM) 110. Among other functions, as used herein the exemplary BCM 110 is a computing device that concatenates the challenge (as will be described further herein below) and transmits the challenge to the transponder 2. The BCM 110 also receives the response from the transponder 2.

Figure 3:
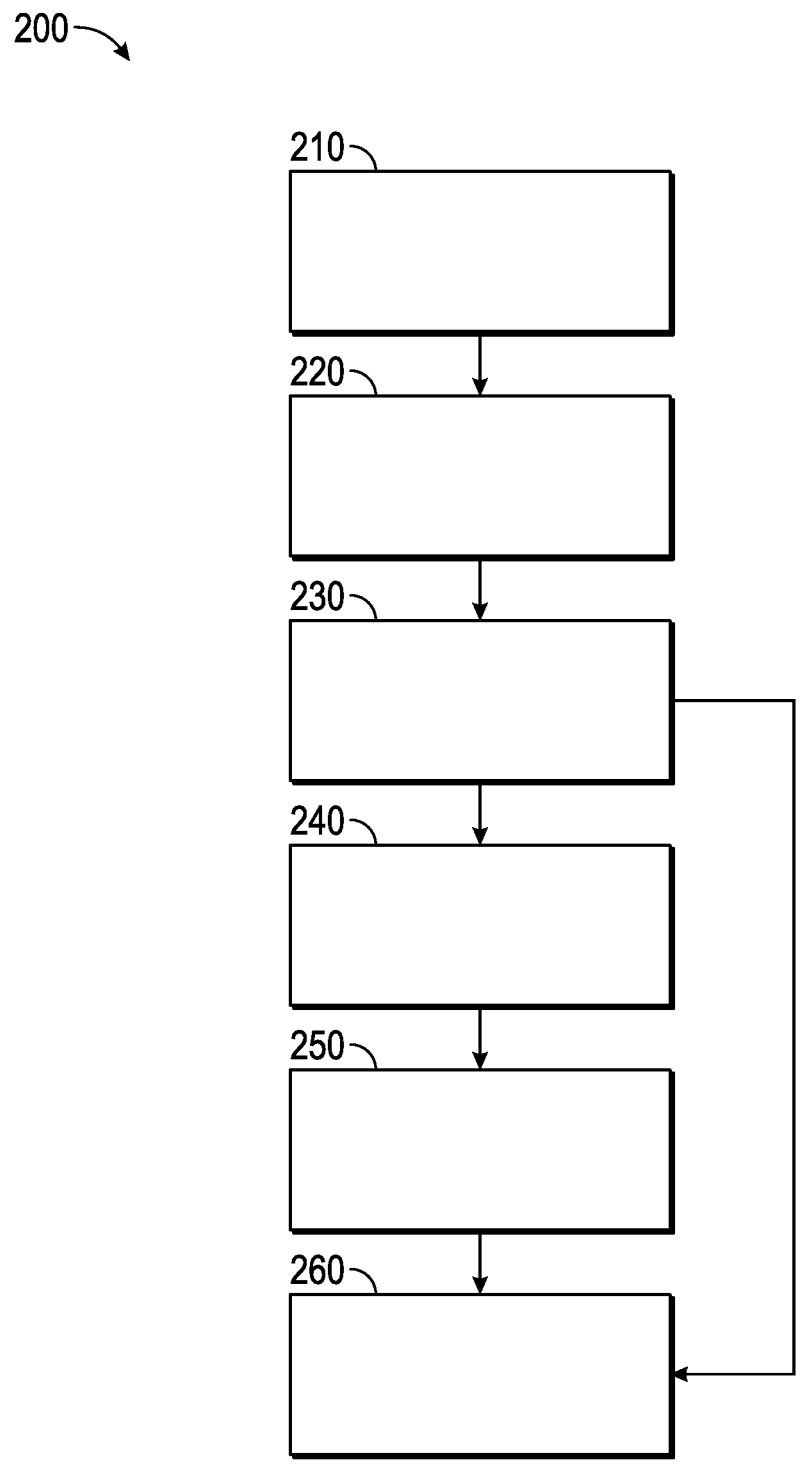
FIG. 3 is a logic flow diagram of an exemplary embodiment of a method for theft deterrence of a vehicle.

FIG. 3 is a simplified logic flow diagram of an exemplary method 200 for actualizing the theft deterrent system 100. As an overarching principle, each of the immobilization points (e.g., 110, 120, 130, and 140) participates by producing an input to a single challenge to a transmission from a transponder 2. This allows the use of a single challenge, but prevents the mobilization of the vehicle where there is a compromise of less than all of the immobilization points.

At process 210, each immobilization point (110, 120, 130, and 140) generates a random number ($R_x$) and broadcasts their number on the bus 118 to all of the other immobilization points. Each immobilization point keeps a local copy of its own random number input to the challenge ($L_x$). Thus, each immobilization point has one guaranteed uncorrupted portion of the inputs used to compute the concatenated challenge, which is its own local copy of its own input ($L_x$). The broadcast of the random numbers may be done in the clear or may be encrypted. The random numbers may be of any length. In preferred embodiments the length is 32 bits or 64 bits. Thus, each of the immobilization points knows the random numbers ($R_x$) generated by each of the other immobilization points as well as its own random number. The generation of the random numbers may be coordinated based on any periodicity, which could be regular, irregular, simultaneous with the periodicity of the other immobilization points, or non-simultaneous.

At process 220, the other immobilization devices receive all of the broadcast random numbers ($R_x$) either directly from the other immobilization points, or from a master immobilization point device that serves to collect the random numbers from each immobilization point. The master immobilization point, if any, distributes the set of all random numbers to all immobilization points (110, 120, 130, 140) via broadcast over bus 118.

At process 230, each immobilization device constructs its own copy of the challenge by concatenating the random numbers from each immobilization device in a specified order, but including its own local random number (Lx) at the appropriate point in the concatenation. Each immobilization device uses its own internal knowledge of its own random number. An immobilization device does not rely on messages received from the bus 118 for its own random number. In a properly operating system free of tampering, each device's copy of the challenge will exactly match the challenge created by the BCM for transmission to the transponder 2.

The concatenation is a bit string of length n*k, where n is the number of immobilization devices and k is the length of the random numbers. A cryptographic hash of the concatenation may be used, a non-limiting example of which is Secure Hash Algorithm-2 (SHA-2). The hash may be truncated if desired. Using a cryptographic hash allows for a shorter challenge than a full concatenation of each random of the random numbers, but ensures that each of the random numbers has a significant contribution on the challenge even if a thief controls all of the random numbers but one.

SHA-2 is a set of cryptographic hash functions (SHA-224, SHA-256, SHA-384, and SHA-512). A cryptographic hash function is a type of hash function that transforms (hashes) an arbitrary set of data elements, such as a text file, into a single fixed length value (the hash) such that any change to the input data elements has a high probability of changing the output hash value. The computed hash value thus acts as a representation of the input values that is significantly affected by each and every input value.

Cryptographic hashes have a number of additional properties. For example, cryptographic hashes have pre-image resistance, second pre-image resistance and collision resistance. Pre-image resistance is the situation where given a hash value (h1), it is difficult to find a hash input (m1) such that hash (m1)=(h1). Second pre-image resistance is the situation where given a hash input (m1) it is difficult to find another input m2, with m2 different than m1, such that hash (m1) =hash (m2)). Collision resistance is the situation where it is difficult to find two distinct inputs that both hash to the same hash value.

For those immobilization devices that are not in communication with the transponder 2 (i.e., 120, 130 and 140), the method 200 moves to process 260. Otherwise the immobilization point 110 that is in communication with the transponder 2, computes another concatenated number in the specified order using only the broadcast random numbers (Rx) and transmits its computed challenge to the transponder 2 at process 240 and receives a reply based on the secret information at process 250 where it is relayed to each immobilization point (110-140) via bus 118. The bus may also be a secure wireless local area network. In alternative equivalent embodiments, the immobilization point 110 in communication with the transponder participates in the random number generation and challenge computation in the same manner as the other immobilization point devices.

At process 260, each of the immobilization devices independently verifies the correctness of the response from the transponder from process 250. Verification is accomplished at each immobilization point (110, 120, 130, 140) by comparing the transponder's response value an expected value using a cryptographic algorithm, the shared secret data and its local concatenation (or cryptographic hash thereof). The local concatenation (or cryptographic hash thereof) is created using its saved local random number ($L_x$) and the broadcast random numbers ($R_x$) from the other immobilization points.

The verification of the correctness is done using a technique that allows for verification of the correctness of a response without offering the possibility of computing the actual response itself. The technique configures the immobilization point (110, 120, 130, 140) to enforce restrictions on the use of the secret data stored within the device. Such restrictions include allowing the verification of a cryptographic MAC without allowing the generation of a corresponding MAC, or the ability to decrypt a message using the secret data without the corresponding ability to encrypt a message using the same secret data.

A means to verify correctness includes provisioning (an action that requires authorization in the first instance) into a cryptographic device a set of data that provides restrictions on how the secret key code 103 can be used. Such restriction includes whether or not the secret key code 103 key can be exported from the secure device, whether it is for encryption/decryption, for MAC usage, or for pseudorandom number generation. If the secret key code 103 is designated for encryption/decryption, the restriction data determines if the secret key code 103 is used to encrypt, decrypt or both. If the secret key code 103 is designated for MAC usage, the restriction determines if the secret key code 103 verifies a MAC, generates a MAC, or both.

As an added security measure, the restrictions may be provisioned into a Secure Hardware Extension (SHE) 105. A SHE is a well-known automotive cryptographic device that is Hersteller Initiative Software (HIS) compliant. A SHE is used to maintain security of sensitive automotive control data by adding a security zone to prevent access to security functions other than those provided by security logic.

A SHE may be used to restrict the use of first secret key code data to the generation of a challenge only. The SHE may then restrict the use of second secret key code data for response verification. Or, secret key code data may be allowed to do bother generation and verification. Hence, even if a hacker accesses an immobilization point and obtains the secret key code data, the secret key code data cannot be used against the restrictions, which compounds the hacker's difficulties. A non-limiting example of a SHE is produced by Fujitsu Semiconductor Europe GMBH.

When the secret data relayed from the transponder 2 and the concatenations are correct, then the immobilization point doing the authentication releases the function that it controls such that the vehicle may become mobile. When the response information does not match, then the immobilization point does not release its function. All immobilization points must release their functions for the vehicle to be mobile.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claim and the legal equivalents thereof.

What is claimed is:

1. A vehicle theft deterrence system, comprising:
a remote transponder;
two or more immobilization point devices, wherein only one of the two or more immobilization point devices is in wireless communication with the remote transponder, the two or more immobilization point devices being configured to each independently verify that the remote transponder is an authorized remote transponder; and
a communication bus interconnecting each of the two or more immobilization point devices.

2. The vehicle theft deterrence system of claim 1, wherein the remote transponder and each of the two or more immobilization point devices contain identical secret key code data and cryptographic algorithms.

3. The vehicle theft deterrence system of claim 2, wherein each of the two or more immobilization point devices generates a random number specific unto itself and broadcasts its random number over the communication bus.

4. The vehicle theft deterrence system of claim 3, wherein each of the two or more immobilization point devices retains a copy of its random number prior to broadcasting its random number over the communication bus.

5. The vehicle theft deterrence system of claim 3, wherein each of the two or more immobilization point devices receives from the communication bus all of the random numbers generated by the other of the two or more immobilization point devices.

6. The vehicle theft deterrence system of claim 5, wherein only an immobilization point device that is in wireless communication with the remote transponder is configured to form a challenge to the remote transponder by concatenating each of the random numbers received from the communication bus in a predetermined order.

7. The vehicle theft deterrence system of claim 6, wherein each of the two or more immobilization point devices concatenates a local challenge from a copy of its own random number and the random numbers of the other of the two or more immobilization point devices in the predetermined order.

8. The vehicle theft deterrence system of claim 7, wherein each of the two or more immobilization point devices compares its local challenge to a reply from the remote transponder and compares its secret data to other information in the reply.

9. The vehicle theft deterrence system of claim 8, wherein each wherein each of the two or more immobilization point devices is configured to enable its function when the secret key code data and the local challenge of a specific immobilization point devices matches the secret data and the other information in the reply.

10. The vehicle theft deterrence system of claim 9, wherein when all of the two or more immobilization point devices enables its function the vehicle may be started and operated normally.

11. The vehicle theft deterrence system of claim 2, further comprising a secure hardware extension in which the secret key code data is provisioned.

12. The vehicle theft deterrence system of claim 11, wherein the secure hardware extension is further provisioned with a set of restrictions, wherein the set of restrictions limits the use of the secret key code data.

13. The vehicle theft deterrence system of claim 6, wherein a hash algorithm is applied to the concatenation of each of the random numbers.

14. A method for theft deterrence of a vehicle comprising two or more immobilization point devices and a communication bus, the method comprising:
each of the two or more immobilization point devices generating a random number and broadcasting their random number on a bus to all of the other two or more immobilization points, where in each of the two or more immobilization point devices retains a local copy of its own random number;

each of the two or more immobilization point devices concatenating the local copy of its own random number with the random numbers of the other of the two or more immobilization point devices from the bus;

from the random numbers broadcast on the bus, concatenating all of the random numbers in a predetermined sequence to form a single challenge;

wirelessly transmitting the single challenge to a remote transponder in response to a message from the remote transponder and receiving a single response;

each of the two or more immobilization point devices comparing the single response from the transponder to their local concatenation; and when the at least a portion of the single response from the transponder is verified against a local concatenation of an immobilization point device, then enabling a function of the immobilization point device.

15. The method of claim 14, wherein each mobilization point comprises a secret hardware extension (SHE).

16. The method of claim 15, wherein the SHE is configured to restrict the use of secret key code data to at least one of verifying the single response and generating the single challenge.

* * * * *